Nov. 12, 1940.  J. VISSER  2,221,211
ASH RECEPTACLE AND LIGHTER
Filed July 1, 1939
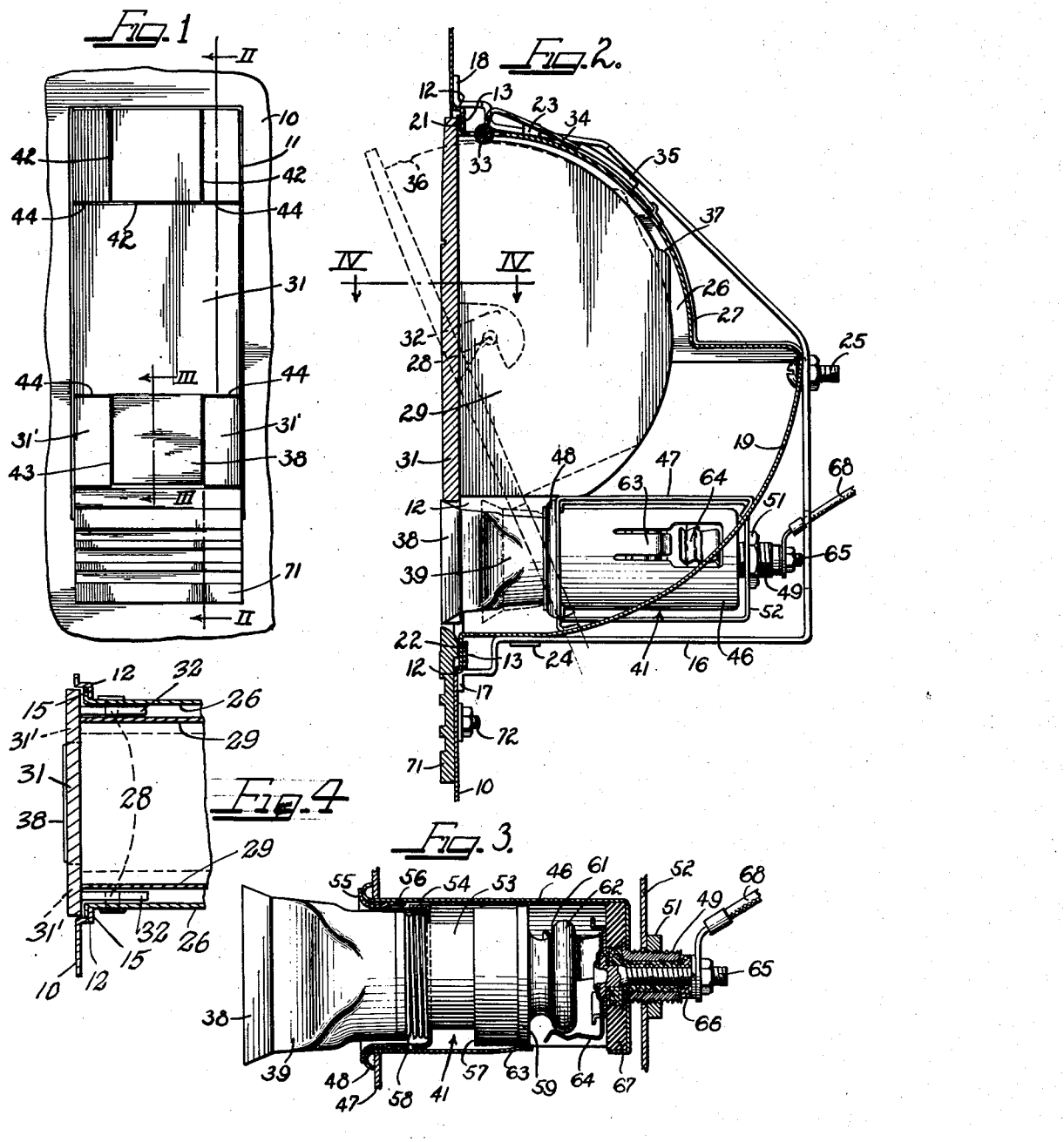
Inventor
JOHN VISSER
by Charles R. Wills Attys.

Patented Nov. 12, 1940

2,221,211

UNITED STATES PATENT OFFICE 2,221,211

ASH RECEPTACLE AND LIGHTER

John Visser, Grand Rapids, Mich., assignor, by mesne assignments, to Reconstruction Finance Corporation, Detroit, Mich., a corporation of United States Application July 1, 1939, Serial No. 282,433

13 Claims. (Cl. 131—234)

This invention relates to ash receptacles and cigarette or cigar lighters, and more particularly to a combination of these two elements adapted to be mounted on the instrument panel of an automobile or on a similar member.

One of the principal objects of this invention is to provide a combined ash tray and cigar or cigarette lighter combined into an assembly which is adapted to be mounted upon an automobile instrument panel with its front face substantially flush with the surface of the instrument panel.

Another object of this invention is to provide an ash receptacle and cigarette lighter assembly which has a substantially flush surface when not in use and which may be brought into operative position merely by pressing in upon a portion of the surface.

Another object of this invention is to provide a cigarette lighter mounting in combination with an ash receptacle and arranged so that opening of the ash receptacle permits access to the otherwise non-protruding and inaccessible cigarette lighter.

A further object of the invention is to provide an improved and novel ash receptacle structure.

Another object of this invention is to provide a mounting for a cigarette lighter upon an automobile instrument panel in such a manner that no portion of the lighter or its mounting projects substantially in front of the plane of the instrument panel while still allowing the lighter to be readily accessible.

Another object of this invention is to provide a cigarette lighter combined with an ash receptacle and arranged so that the closing of the ash receptacle will cause the cigarette lighter to move to its "off" position in case it should happen to be in its "on" position.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is a face view of my combined ash receptacle and cigarette lighter mounted in an automobile instrument panel;

Figure 2 is a cross-section taken on the line II—II of Figure 1 and looking in the direction of the arrows; and Figure 3 is a cross-section on the line III—III of Figure 1 looking in the direction of the arrows and showing some of the internal construction of the cigarette lighter, a part of the device being shown in elevation.

Figure 4 is a cross-section on the line IV—IV of Figure 2, looking in the direction of the arrows.

The particular embodiment of the invention shown in the drawing is shown mounted on an automobile instrument panel 10, although of course it will be understood that the device which is the subject of the present invention may be employed in other locations, such as in a panel or other members other than the instrument panel of an automobile or in other locations having no connection with vehicles. The panel 10 is provided with a rectangular opening 11 surrounded and reinforced by a rearwardly projecting flange 12 which carries lips 13 and the top and the bottom of the opening and projecting in toward the center of the opening.

The ash receptacle and cigarette lighter assembly fits in the above described opening and comprises an outer frame member 16 bent into approximately the shape of a U and having its two ends formed into feet 17 and 18 which are adapted to rest against the back of the panel 10 immediately above and below the panel opening 11. The frame also comprises an inner member 19, made of a strip of metal substantially as wide as the panel opening 11 and bent into a substantially U shape whose width from one leg to the other is such that the member 19 can fit into the opening 11 between the inwardly directed lips 13 at the top and bottom of the opening. The ends of the inner frame member 19 are bent outwardly to form feet 21 and 22 whose rear surfaces are adapted to bear against the front surfaces of the inwardly directed lips 13 at the top and bottom of the panel opening 11.

The inner and outer frame members 19 and 16 lie one within the other but do not necessarily fit against each other except at a few points. At these points, they are secured together in any suitable manner as by lugs 23 and 24 punched out of the inner frame 19 and fitting around the edges of the outer frame 16 or by one or more bolts 25. The securing of the frame together in this manner holds the two frame members 16 and 19 fixed with respect to each other with the feet 17 and 18 of one frame member 16 pressed against the back of the panel 10 above and below the panel opening 11 and with the feet 21 and 22 of the other frame member 19 fitting within the panel opening and bearing against the front faces of the lips 13 at the top and bottom of the panel opening. The frame 16, 19 is thus rigidly secured to and carried by the panel 10.

The frame also comprises a pair of side plates 26 having flanges 27 fitting on the outside and spot welded or otherwise suitably secured to the inner frame member 19. The side plates 26 are on the upper portion of the frame and extend down far enough to carry a pair of pivots 28 for the ash receptacle 29. The front edges of the side plates 26 extend into the panel opening 11 and may be provided with outwardly directed flanges adapted to bear against the front faces of lips 15 extending in from the portion of the flange 12 at the side of the panel opening 11.

The ash receptacle 29 is formed of sheet metal and is mounted on and carried by a substantial ornamental face member or plate 31 which fits into and occupies the major portion of the panel opening 11. The back of the face member 31 carries two hook-like bearings 32 which project back at either side of the ash receptacle 29 and fit over the inwardly projecting pivots or trunnions 28 carried by the frame side plates 26. The hook-like bearings 32 are open on the lower side and are kept pressed down into engagement with the trunnions 28 by means of a pair of rollers 33 which press down and ride upon the upper edges of the ash receptacle 29. The rollers 33 are carried on the end of a U-shaped wire spring 34 secured to the inner frame member 19 by means of a bracket 35, the ends of the spring 34 being bent down toward the ash receptacle 29 and then outwardly to form pivots for the rollers 33. The edges of the outer frame member 16 are cut away to allow the spring 34 to work freely and the inner frame member 19 is provided with apertures through which the rollers 33 project and bear upon the upper edge of the ash receptacle 29.

The major portions of the upper edges of the ash receptacle 29 form portions of a circle concentric with the pivot 28 of the ash receptacle so that the spring 34 and rollers 33 will have no cam action tending to swing the ash receptacle 29 in either direction. However, the upper edges of the ash receptacle 29 are provided with shallow depressions or notches 36 which receive the rollers 33 when the receptacle is swung to its closed position and enable the spring 34 to resiliently hold it in that position. The edges of the ash receptacle 29 are also provided with low, rounded projections 37 located so as to come into contact with the rollers 33 and stop the swinging of the receptacle when it reaches its open position. The projections or bosses 37 are low enough so that they can be forced under the rollers 33 by the application of a moderate amount of force to the ash receptacle 29, whereupon the ash receptacle 29 and its face member 31 can be rotated to a position at right angles to their closed position. When the parts 29 and 31 are in this position, the face member 31 is horizontal and the hook-like bearings 32 have been swung to a position in which they lie entirely above, in front of and underneath the trunnion or pivot 28, and the entire swinging ash receptacle assembly, 29, 31, 32 can be withdrawn by a horizontal movement to permit its being emptied.

The ash receptacle face member 31 does not close the entire panel opening 11 but comprises an upper or main portion which closes the upper portion of the panel opening and two depending leg portions 31 which extend down at the sides of the panel opening, leaving a square space between them. The space between the leg portions 31' of the ash receptacle face member 31 is occupied by a square end plate 38 on the handle 39 of the cigarette lighter 41. The end plate 38 on the lighter handle 39 and the ash receptacle face member 31 are made of the same material and finished in the same way, and the ash receptacle face member 31 is provided with deep grooves 42 in its upper portion arranged to simulate the cracks between the edges of the handle and plate 39 and the ash receptacle face member 31, and additional grooves 44 are provided to make a pleasing design so that the cracks around the lighter handle end plate 38 appear to be only portions of the design formed by the grooves 42 and 44.

The lighter 41 comprises a socket 46 which fits through a hole in a bracket 47 spot welded to one of the frame members 19, the socket 46 having a flange 48 bearing against the face of the bracket 47. The socket 46 is held in position on the bracket 47 by means of a stud 49 projecting from the base of the socket and carrying a nut 51 which bears against the face of a U-shaped spacing member 52 having legs bearing against the back of the bracket 47.

The removable portion of the lighter 41 comprises a shank 53 secured to the handle 39 and having a flanged collar 54 slidable longitudinally upon it. The collar 54 is adapted to fit into the end of the socket 46 with its flange 55 bearing against the flange 48 of the socket to prevent the collar 54 from sliding in beyond a predetermined distance. The collar 54 has a plurality of spring fingers 56 formed in its side and arranged to press resiliently outward against the interior of the socket 46 in order to resiliently hold the collar 54 in its position at the mouth of the socket while allowing it to be readily removed therefrom.

The shank 53 of the lighter is formed with a shoulder 57 which is resiliently held up against the end of the collar 54 by a spring 58 located within the collar 54. The position in which the lighter is normally held by the spring 58 is the inoperative position in which the electrical circuit for heating the lighter is broken, but the spring 58 permits the lighter to be moved to its operative position in which the necessary contacts for completing the electric circuit are made. This position is shown in Figure 3.

The end of the shank 53 carries the lighter head, which comprises a metal contact member 59 which covers the end of and projects slightly beyond the sides of the shank 53. The contact member 59 carries a sheet of insulation 61 and a flat metal cup 62 on its face, the cup 62 containing a spirally coiled heating element secured at one end to the wall of the cup and at the other end to a central rivet which secures the metal cup 62 to the contact member 59 and which also makes an electrical connection between the inner end of the heating element and the contact member in the conventional manner.

In order to insure that the contact member 59 makes a positive contact with a grounded portion of the device when the cigarette lighter is pushed in, the socket 46 is provided with a plurality of stamped-out spring fingers 63 adapted to engage the edge of the contact member 59 when it is moved into the position shown in Figure 3. A clip having three spring arms 64 is provided at the end of the socket 46 for receiving and making an electrical contact with the metal cup 62 on the end of the lighter. The clip 64 is carried by a stud 65 which passes longitudinally through and is insulated from the stud 49 at the end of the lighter socket 46, the stud 49 being provided with a longitudinal passage through which the stud 65 and its insulation 66 pass. Insulation 67 is also provided between the clip 64 and the end of the socket 46 so that the clip 64 is in electrical contact only with the cup 62 and the stud or screw 65 which serves as a means of connection to an electric wire 68.

The cigarette lighter 41 is of the automatic type, that is of the type which automatically disconnects itself as soon as the heating element of the lighter has reached the proper temperature. This may be accomplished in any conventional manner, one method being to form the clip 64 of bi-metal arranged so that the clip 64 will loosen its grip upon the cap or cup 62 on the end of the lighter as the clip 64 is heated through its proximity to and contact with the hot end of the lighter. As soon as the clip 64 loosens its grip, the spring 68 pulls the cap or cup 62 of the lighter away from the clip 64 and breaks the contact through which the heating element is supplied with electricity. This acts as a signal to the person desiring to use the lighter, who thereupon withdraws the lighter from its socket 46 and who uses it before it has cooled off.

Means are also provided for disconnecting the lighter whenever the ash tray is moved to its closed position shown in Figure 2. This means consists in shaping the handle 39 of the lighter and the lower portion of the ash receptacle face member 31 in such a way that the face member 31 will strike the lighter handle 39, as shown in dotted lines in Figure 2, if the lighter is in its pushed-in position shown in dotted lines, and free it from the grip of the spring clip 64. As soon as this occurs, the spring 58 snaps the lighter out to the position shown in full lines in Figure 2 and the current flowing through the lighter is broken.

Because of the fact that the legs 31' of the ash receptacle face member 31 swing into the panel opening 11, and the end plate 38 on the lighter also moves into the opening, they cannot easily be made to cover the extreme bottom of the panel opening 11. This portion of the opening is covered by an ornamental escutcheon member 71 secured to the panel by bolts 72 below the opening 11, and it projects up into close proximity with the lower edges of the face member 31 and lighter handle end plate 38.

From the above, it will be seen that I have provided a novel ash receptacle and lighter combined in a way to present surface lying substantially in the plane of the panel upon which they are mounted when not in use and which are readily accessible at all times. It will also be seen that I have provided a combined ash receptacle and lighter which projects a minimum distance forward of the panel upon which they are mounted when the ash receptacle is open and in a position for use. While I have shown my invention as being constructed with a cigarette lighter of the automatic type, it will of course be appreciated that this lighter may be of the non-automatic type and it will be noted that I have provided an arrangement which automatically disconnects the lighter even if it be of the non-automatic type, when the ash receptacle is closed, thereby minimizing the possibility of accidentally leaving the lighter connected for a long period of time.

While I have shown only one form of my invention, it will of course be understood that I do not wish to be limited thereto, since many modifications may be made, and I therefore contemplate by the appended claims to cover all such modifications as fall within the true spirit and scope of my invention.

I claim as my invention:

1. In a lighter assembly, means for removably supporting a lighter behind a panel with the handle end of said lighter in an opening in said panel and substantially in the plane of said panel, said opening being larger than said handle end, and movable means for closing said opening around said handle and providing a surface substantially flush with said panel and said handle end.

2. In a lighter assembly, means for removably supporting a lighter behind a panel with the handle end of said lighter in an opening in said panel and substantially in the plane of said panel, said opening being larger than said handle end, a closure member fitting around said handle end, and means for supporting said member for swinging out of the plane of said panel upon pressure being applied thereto adjacent said lighter handle end.

3. In a lighter assembly for mounting in an aperture in a panel, a removable lighter, means for supporting said lighter behind said panel with the handle end thereof in said opening and substantially in the plane of said panel, a face member closing said opening around said handle end, and means for supporting said face member for movement away from around said handle end for permitting access to said handle end.

4. In a lighter assembly adapted to be mounted in an aperture in a panel, comprising a removable lighter, means for supporting said lighter behind said panel with the handle end thereof in said aperture and substantially in the plane of said panel, a face member adapted to fill the portion of said aperture not occupied by said lighter handle end, and means on said supporting means for supporting said face member for swinging movement of said face member out of the plane of said panel.

5. In a lighter assembly adapted to be mounted in an aperture in a panel, comprising a removable lighter, means for supporting said lighter behind said panel with the handle end thereof in the lower part of said aperture and substantially in the plane of said panel, a face member adapted to fill the portion of said aperture not occupied by said lighter handle end, and means on said supporting means for supporting said face member for swinging movement about an axis extending horizontally across said aperture above said lighter whereby the portion of said face member adjacent said lighter handle end may be pushed back out of the plane of said panel for permitting access to said lighter handle end.

6. In a lighter assembly adapted to be mounted in an aperture in a panel, comprising a removable lighter, means for supporting said lighter behind said panel with the handle end thereof in the center of the lower part of said aperture and substantially in the plane of said panel, said aperture being wider than said lighter handle end, a face member adapted to fill the upper part of said aperture and to extend down at either side of said lighter handle end, and means on said supporting means for supporting said face member for swinging movement about an axis extending across said aperture above said lighter whereby the lower part of said face member may be swung back out of the plane of said panel for permitting access to the side of said lighter handle end through the lower portion of said aperture.

7. In a lighter assembly adapted to be mounted in an aperture in a panel, comprising a frame adapted to be secured in back of said aperture, a lighter carried by said frame and having a handle end located in the plane of said panel, a closure member in the plane of said panel, said handle end and said closure member being adapted to fill said aperture, and means for supporting said closure member on said frame for movement with respect thereto.

8. In a lighter assembly adapted to be mounted in an aperture in a panel, comprising a frame adapted to be secured in back of said aperture, a lighter carried by said frame and having a handle end located in the plane of said panel, a closure member in the plane of said panel above said lighter handle end and extending down at either side thereof, said handle end and said ash receptacle front being adapted to fill said aperture, and means for supporting said closure member on said frame for swinging movement with respect thereto about an axis extending across said closure member below the top thereof and above said lighter handle end.

9. In a lighter assembly adapted to be mounted in an aperture in a panel, comprising a frame adapted to be secured in back of said aperture, a lighter carried by said frame and having a handle end located in the plane of said panel, a closure member in the plane of said panel above said lighter handle end and extending down at either side thereof, said handle end and said closure member being adapted to fill said aperture, means for supporting said closure member on said frame with swinging movement with respect thereto about an axis extending across said aperture above said lighter handle end and below the top of said closure member, and stop means for preventing swinging movement of said closure member back out of the plane of said panel and permitting movements thereof forward out of the plane of said panel, the distance between the portions of said closure member front depending at either side of said lighter handle end being greater than the width of any portion of said lighter whereby said depending portion may swing back at either side of said lighter when the upper portion of said closure member is swung forward out of the plane of said handle.

10. In an ash receptacle and lighter assembly, an ash receptacle movable between open and closed positions, an electric lighter adapted to be connected to a source of electric energy, and means operated by the movement of said ash receptacle to said closed position for disconnecting said lighter from said source.

11. In an ash receptacle and lighter assembly, a socket, a lighter slidable in and withdrawable from said socket, means associated with said socket for holding said lighter therein in two positions, means for causing said lighter to heat when in one of said positions, an ash receptacle located adjacent to said socket and movable from open to closed positions, and means for moving said lighter from said one position to the other said position thereof when said receptacle is moved to said closed position.

12. In an ash receptacle and lighter assembly, a socket, a lighter slidable in and withdrawable from said socket, means associated with said socket for holding said lighter therein in two positions, said lighter having a portion projecting from said socket when in either of said two positions, means for causing said lighter to heat when in one of said positions, means for resiliently urging said lighter from said one position to the other of said positions, snap means for holding said lighter in said one position, an ash receptacle located adjacent to said socket and movable from open to closed positions, and means on said ash receptacle for striking said projecting portion of said lighter and for releasing said lighter from said snap means as said receptacle is moved from open to closed position.

13. In combination, a supporting structure for supporting an ash receptacle for movement to open and closed positions, an accessory carried by said support independently of said ash receptacle for use in conjunction therewith, and means interconnecting said receptacle to said accessory so that movement of said receptacle controls and effects movement of said accessory into accessible position for removal from said support.

JOHN VISSER.